United States Patent
Yeh

(10) Patent No.: US 9,781,721 B1
(45) Date of Patent: Oct. 3, 2017

(54) TRANSMISSION METHOD AND TRANSMISSION SYSTEM FOR SHARING AN UNLICENSED CHANNEL IN A WIRELESS COMMUNICATIONS SYSTEM

(71) Applicant: INSTITUTE FOR INFORMATION INDUSTRY, Taipei (TW)

(72) Inventor: Tsung-Lin Yeh, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 15/365,904

(22) Filed: Nov. 30, 2016

(30) Foreign Application Priority Data

Nov. 15, 2016 (TW) .............................. 105137309 A

(51) Int. Cl.
*H04W 72/00* (2009.01)
*H04W 72/04* (2009.01)
*H04L 12/801* (2013.01)
*H04B 17/318* (2015.01)

(52) U.S. Cl.
CPC ...... *H04W 72/0453* (2013.01); *H04B 17/318* (2015.01); *H04L 47/29* (2013.01); *H04W 72/0473* (2013.01)

(58) Field of Classification Search
None
See application file for complete search history.

(56) References Cited

U.S. PATENT DOCUMENTS

| 2016/0037544 A1 | 2/2016 | Wang | |
| 2016/0302076 A1* | 10/2016 | Chou | H04W 16/14 |
| 2017/0086214 A1* | 3/2017 | Kalhan | H04W 72/1215 |

OTHER PUBLICATIONS

The office action of the corresponding Taiwan application dated Jun. 6, 2017.

* cited by examiner

*Primary Examiner* — Idowu O Osifade
(74) *Attorney, Agent, or Firm* — CKC & Partners Co., Ltd.

(57) ABSTRACT

A transmission device includes an antenna and a first transceiver. The antenna receives a current channel information. The current channel information includes an unlicensed channel information of an unlicensed channel. The first transceiver measures an energy information of a current channel according to the unlicensed information. When the first transceiver determines that the energy information is higher than a triggering threshold, the first transceiver accumulates an energy intensity of the current channel and detects an energy feature. The first transceiver determines a spectrum range occupied by a user of the unlicensed channel, avoids transmitting a to-be transmitted data through the spectrum range, and measures an another unlicensed channel, according to an accumulated result of the energy intensity and the energy feature.

15 Claims, 3 Drawing Sheets

US 9,781,721 B1

TRANSMISSION METHOD AND TRANSMISSION SYSTEM FOR SHARING AN UNLICENSED CHANNEL IN A WIRELESS COMMUNICATIONS SYSTEM

CROSS-REFERENCE TO RELATED APPLICATION

This application claims priority to Taiwan Application Serial Number 105137309, filed Nov. 15, 2016, which is herein incorporated by reference.

BACKGROUND

Technical Field

The present disclosure relates to a transmission device, a transmission method and a transmission system. More particularly, the present disclosure relates to a transmission device, a transmission method and a transmission system using the unlicensed channel.

Description of Related Art

In general, a wireless communication system (e.g., the LTE system) runs in a specific RF (Radio frequency) spectrum, and an electronic device (e.g., a mobile phone) is able to communicate with a base station through the specific RF spectrum. The wireless telecom operators have to subscribe for or buy this specific RF spectrum from the government, so as to obtain the usage right of it.

In an entire transmission spectrum, some channels belong to unlicensed channels, e.g., some channels that the government retains. When the wireless telecom operators intend to use the unlicensed channels, they do not have to buy the usage right of the unlicensed channels from the government. Therefore, plural of wireless telecom operators (e.g, the Wi-Fi, the Bluetooth, or the LTE) compete for these unlicensed channels in order to obtain more transmission channels. For example, the LTE communication system establishes licensed-assisted access (LAA) protocol, enhanced licensed-assisted access (eLAA) protocol, and so on, which are used for standardizing the operations of the unlicensed channels in the LTE communication system.

However, in the process of the competition for the unlicensed channels, one device with one wireless communication system (e.g., the LTE communication system) has to coexist with devices with other wireless communication systems (e.g., the Wi-Fi communication system) that are not controlled by its wireless communication system. For example, when the LTE communication system intends to access an unlicensed spectrum or a shared spectrum of the wireless communication system, other communication devices with the same or different wireless access technique may intend to access the same unlicensed or shared spectrum. It can be seen that plural of devices may compete or interfere with each other when they share the unlicensed spectrum. Therefore, how to provide a method for sharing the wireless communication resource in the unlicensed spectrum and a device using the same becomes a problem.

SUMMARY

To address the issues, one aspect of the present disclosure is to provide a transmission device including an antenna and a first transceiver. The antenna is configured for receiving a current channel information. The current channel information including an unlicensed channel information of an unlicensed channel. The first transceiver is configured for measuring an energy information of a current channel according to the unlicensed channel information. When the first transceiver determines that the energy information is greater than a trigger threshold value, the first transceiver accumulates an energy intensity of the current channel and detects an energy feature. The first transceiver determines a spectrum range occupied by a user of the unlicensed channel according to an accumulated result of the energy intensity and the energy feature, avoids using the spectrum range, and measures another unlicensed channel.

Another aspect of the present disclosure is to provide a transmission method including: receiving a current channel information by an antenna, in which the current channel information includes an unlicensed channel information of an unlicensed channel; measuring an energy information of a current channel by a first transceiver according to the unlicensed channel information; accumulating an energy intensity of the current channel and detecting an energy feature by the first transceiver when the energy information is greater than a trigger threshold value; determining a spectrum range occupied by a user of the unlicensed channel by the first transceiver according to an accumulated result of the energy intensity and the energy feature; avoiding using the spectrum range and measuring another unlicensed channel by the first transceiver.

Other one aspect of the present disclosure is to provide a transmission system including a base station, an antenna and a transceiver. The base station is configured for transmitting a current channel information. The current channel information including an unlicensed channel information of an unlicensed channel. The antenna is configured for receiving the current channel information. The transceiver is configured for measuring an energy information of a current channel according to the unlicensed channel information. When the transceiver determines that the energy information is greater than a trigger threshold value, the transceiver accumulates an energy intensity of the current channel and detects an energy feature. The transceiver determines a spectrum range occupied by a user of the unlicensed channel according to an accumulated result of the energy intensity and the energy feature, avoids using the spectrum range, and measures another unlicensed channel.

As mentioned above, by measuring the energy information of the current channel and estimating the users who occupy the unlicensed channel, the present disclosure is able to avoid selecting the unlicensed channel occupied by the users and select another unlicensed channel which is unoccupied. Accordingly, the present disclosure provides a transmission method, a transmission device and a transmission system which are able to effectively and precisely share the wireless communication resource through the unlicensed spectrum.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
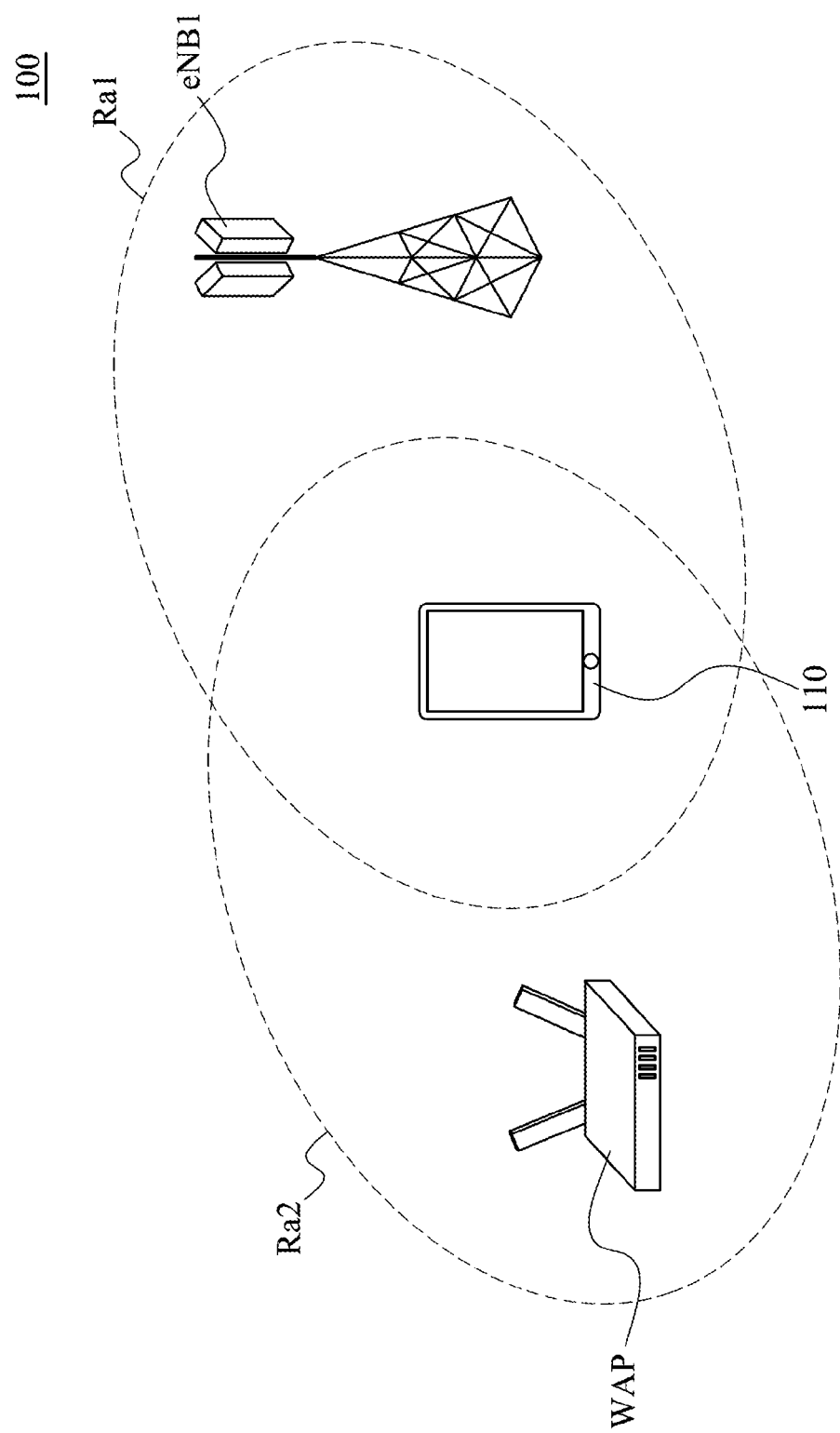
FIG. 1 depicts a schematic diagram of a wireless communication system according to one embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 depicts a schematic diagram of a wireless communication system 100 according to one embodiment of present disclosure. In one embodiment, the wireless communication system 100 includes a transmission device 110 and base stations eNB1 and WAP. In one embodiment, the transmission device 110 is, for example, a tablet, a notebook, a smart phone or other electronic devices with the transmission function. In one embodiment, the base station WAP is a Wi-Fi base station.

In one embodiment, the base station eNB1 uses the LTE communication system and the base station WAP uses the Wi-Fi communication system. Accordingly, when the transmission device 110 (e.g., a smart phone) is located in an overlapping area between a transmission range Ra1 of the base station eNB1 and a transmission range Ra2 of the base station WAP and the transmission device 110 intends to transmit the signals through an unlicensed channel, the base stations eNB1 and WAP will interfere or compete with each other. In order to solve this problem, the present development tendency in the art is to transmit data through the unlicensed channel in, for example, licensed-assisted access (LAA) protocol or enhanced licensed-assisted access (eLAA) protocol. However, these protocols fail to have good channel detection mechanism to support dynamic channel selection. Therefore, a transmission method, a transmission device and a transmission system are provided below for sharing the wireless communication resource in the unlicensed spectrum, which provide good channel detection mechanism and support dynamic channel selection.

Figure 2:
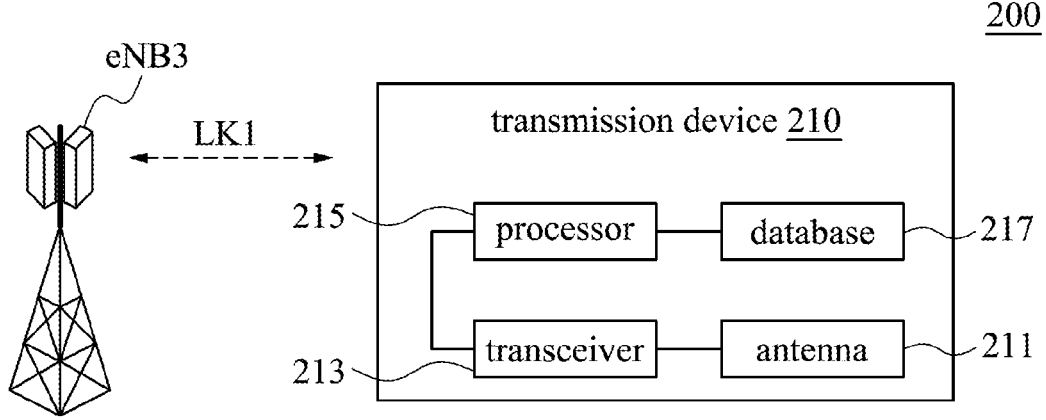
FIG. 2 depicts a block diagram of a transmission system according to one embodiment of the present disclosure.

Reference is made to FIG. 2. FIG. 2 depicts a block diagram of a transmission system 200 according to one embodiment of the present disclosure. In one embodiment, the transmission system 200 includes a transmission device 210 and a base station eNB3. In one embodiment, the transmission device 210 is, for example, a tablet, a notebook, a smart phone or other electronic devices with the transmission function.

In one embodiment, the base station eNB3 is configured for transmitting a current channel information. The current channel information includes an unlicensed channel information and/or an internal channel information, wherein the unlicensed channel information means information corresponding to the unlicensed channel and the internal channel information means information corresponding to the transmission method between the transmission device 210 and the base station eNB3 obtained by authorization.

In one embodiment, the transmission device 210 includes an antenna 211 and a transceiver 213. In one embodiment, the transmission device 210 is able to run in the LTE transmission mode. The bandwidth of the LTE system is between 5 MHz and 20 MHz. The bandwidth of a single transceiver 213 is about 30 MHz. The bandwidth of the antenna 211 is about 130 MHz. The number of the transceiver 213 is plural (e.g., 2-5). In one embodiment, a communication link LK1 is able to be established between the transmission device 210 and the base station eNB3.

In one embodiment, the transmission device 210 is able to include plural of the antennas and/or plural of the transceivers, which are used for establishing the communication links with plural of the base stations and measuring the current channel information from the base stations.

In one embodiment, the transmission device 210 further includes a processor 215 and a database 217. The processor 215 is configured for performing various computations and controlling each component of the transmission device 210. The processor 215 can be implemented by using a microcontroller, a microprocessor, a digital signal processor, an application specific integrated circuit (ASIC), or a logic circuit. In one embodiment, database 217 can be stored in a storage device. The storage device can be implemented by using a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

In general, in the wireless communication system, the antenna 211 receives the signals which are transmitted through the air, and the transceiver 213 selects a correct channel from the signals which is received from the antenna 213. After down-conversion of frequency and processing, the transceiver 213 converts the received weak RF signals into the fundamental frequency signals which are used for back end fundamental frequency signal processing.

In one embodiment, the antenna 213 is configured for receiving a current channel information (e.g., information corresponding to the communication link LK1) transmitted from the base station eNB3. The current channel information includes an unlicensed channel information (e.g., information corresponding to plural of unlicensed channels) of at least one unlicensed channel. The transceiver 213 is configured for measuring an energy information of a current channel according to the unlicensed channel information.

Figure 3:
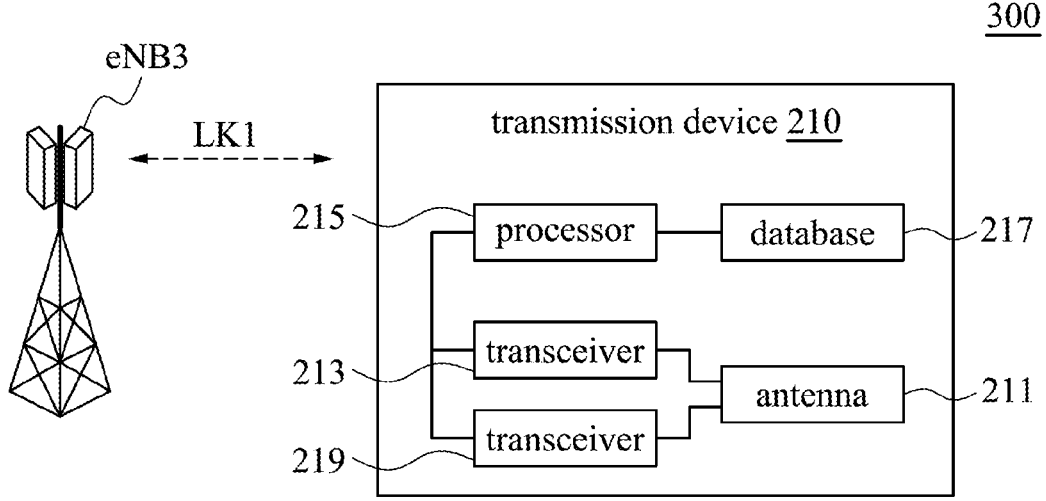
FIG. 3 depicts a block diagram of a transmission system according to one embodiment of the present disclosure.

Reference is made to FIG. 3. FIG. 3 depicts a block diagram of a transmission system 300 according to one embodiment of the present disclosure. The difference between the transmission system 300 of the FIG. 3 and the transmission system 200 of the FIG. 2 is that the transmission system 300 further includes a transceiver 219. The transceiver 219 is configured for transmitting and receiving the to-be transmitted data through an internal channel, and configured for measuring an internal channel information of the internal channel. The processor 215 is further configured for storing the internal channel information and an external channel information in the database 217. In one embodiment, the internal channel information is the unlicensed channel used for establishing the communication link between the transmission device 210 and the base station eNB3.

It is noted that since the unlicensed channel may be occupied by various transmission devices, the transmission device 210 may request for dynamically switching channels while transmitting data through the unlicensed channel. On the contrary, it is unnecessary for the telecom operators to perform the coexistence mechanism in the licensed channel since they totally own the channel resource. Accordingly, the present disclosure provides a transmission method, a transmission device and a transmission system, which are able to apply to the unlicensed channel and dynamically detect the occupied condition of the unlicensed channel.

Figure 4:
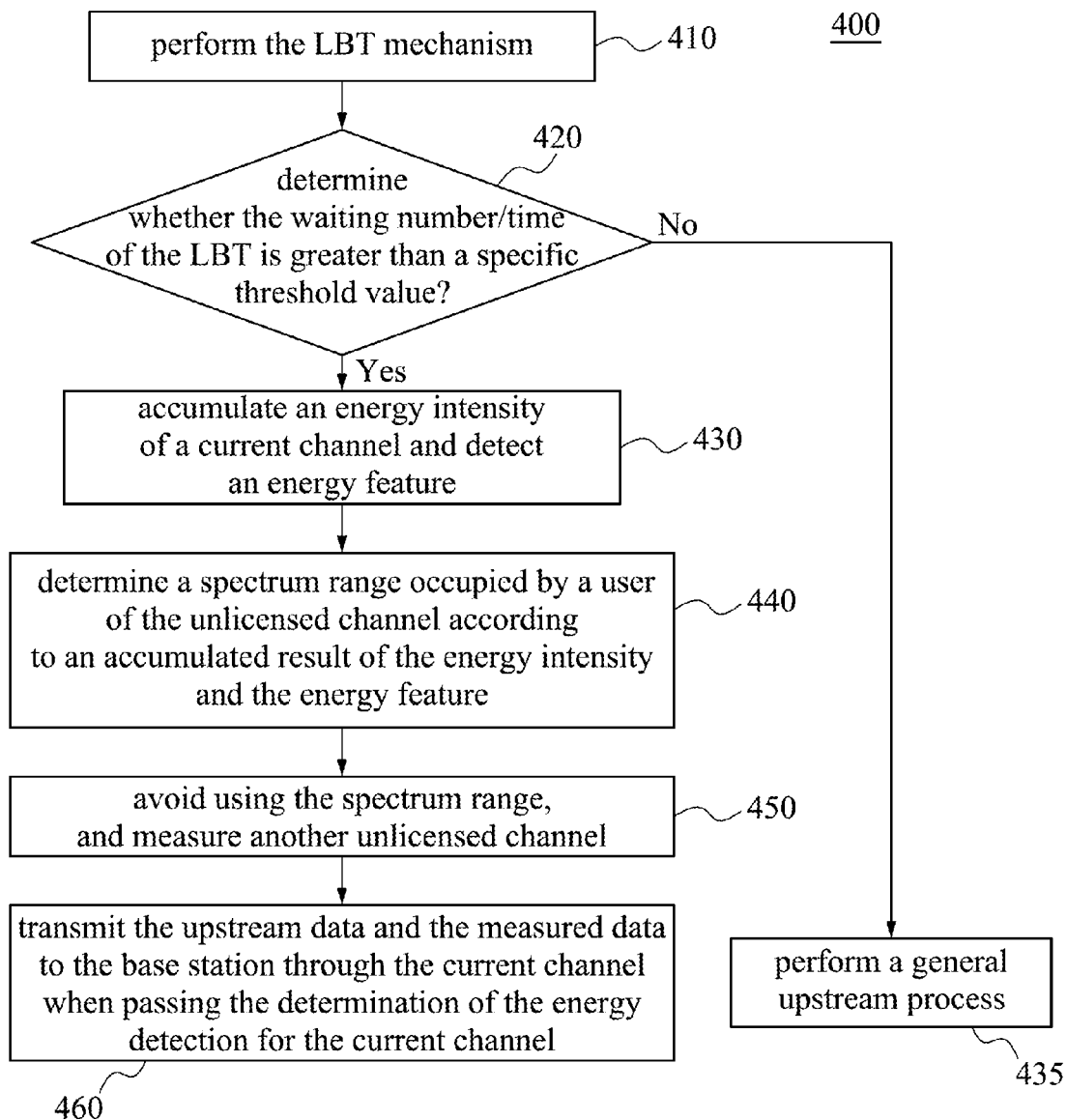
FIG. 4 depicts a flow chart of a transmission method according to one embodiment of the present disclosure.

Reference is made to FIG. 2 and FIG. 4. FIG. 4 depicts a flow chart of a transmission method 400 according to one embodiment of the present disclosure.

In operation 410, the processor 215 starts to perform the LBT (Listen Before Talk) mechanism. The LBT mechanism is that any device (e.g., the transmission device 210) which intends to use the unlicensed channel has to listen (detect) in advance to determine whether this specific channel is occupied. If the specific channel is not busy, the transmission device 210 is able to performing transmission through the specific channel. In some cases, the longest occupied period of the specific channel is only 10 microseconds, and afterwards this specific channel is released and the LBT mechanism is repeated, whereby fair access to the specific channel is assured so that plural of the transmission devices are able to share the unlicensed channel.

In one embodiment, the transceiver 213 measures an energy information of the current channel when the processor 215 starts to perform the LBT mechanism.

In one embodiment, the energy information is determined as a waiting time or a determination number in which the transceiver 213 determines the current channel.

In one embodiment, when the processor 215 starts to perform the LBT mechanism, the transceiver 213 sends a message about the determination of the current channel and determines whether the unlicensed channel is occupied according to the energy information of the current channel. For example, the transceiver 213 determines whether the energy accumulated in a specific period is greater than an energy threshold value. If the energy accumulated in the specific period is determined to be greater than the energy threshold value, the transceiver 213 detects this unlicensed channel and determines whether it is occupied again after waiting a period of time. By repeating to perform theses detection operations until the unlicensed channel is determined to be unoccupied, the time when the to-be transmitted data is able to be transmitted through the unlicensed channel is determined. Moreover, the transceiver 213 is able to record and store each of the plural of the waiting times in the database 217. Furthermore, the transceiver 213 is able to record and store the determination number in the database 217, too.

In operation 420, the transceiver 213 determines whether the waiting number/time of the LBT is greater than a specific threshold value. In one embodiment, the transceiver 213 determines whether the energy information is greater than a trigger threshold value. If the transceiver 213 determines that the energy information is greater than the trigger threshold value, operation 430 is performed. If the transceiver 213 determines that the energy information is not greater than the trigger threshold value, operation 435 is performed. In operation 435, the transceiver 213 is able to directly perform a general upstream process, i.e., transmitting the to-be transmitted data through this unlicensed channel.

In one embodiment, after the transceiver 213 sends the message about the determination of the current channel, if the unlicensed channel is determined to be occupied according to the message about the current channel, the transceiver 213 sends the message about the determination of the current channel again after a waiting time. In one embodiment, when the energy information is determined as the waiting time in which the transceiver 213 determines the current channel, the trigger threshold value is set as a time threshold value. For example, the time threshold value is set as 50 microseconds. If the transceiver 213 determines that the waiting time for which the current channel needs to wait is greater than 50 microseconds, operation 430 is performed.

In one embodiment, after the transceiver 213 sends the message about the determination of the current channel, if the unlicensed channel is determined to be occupied according to the message about the current channel, the transceiver 213 sends the message about the determination of the current channel again and accumulates the number of the request after a waiting time. In one embodiment, when the energy information is determined as the determination number in which the transceiver 213 determines the current channel, the trigger threshold value is set as a number threshold value. For example, the number threshold value is set as 10 times. If the determination number accumulated by the transceiver 213 is greater than 10, operation 430 is performed.

Figure 5:
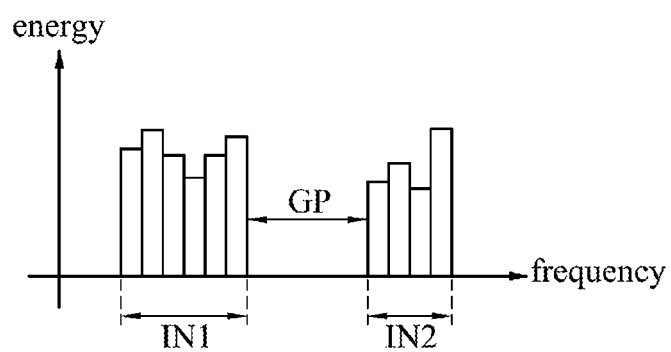
FIG. 5 depicts a schematic diagram of an energy feature according to one embodiment of the present disclosure.

In operation 430, the transceiver 213 accumulates an energy intensity of a current channel and detects an energy feature. Reference is made to FIG. 5. FIG. 5 depicts a schematic diagram of an energy feature according to one embodiment of the present disclosure. In one embodiment, the time threshold value is set as 50 microseconds. If the transceiver 213 determines that the waiting time of the current channel is greater than 50 microseconds, the transceiver 213 accumulates the energy intensity of the current channel (e.g., accumulating the energy intensity in these 50 microseconds) and detects the energy feature.

In one embodiment, the energy feature includes a bandwidth information or a signal distribution feature. For example, as shown in FIG. 5, the transceiver 213 detects that the current channel has energy in frequency periods IN1 and IN2 and has no energy in a frequency period GP. In other words, the energy feature of the current channel is the signal distribution in which higher energy occurs in two frequency periods IN1 and IN2 and lower energy occurs in the frequency period GP which is between these two frequency periods IN1 and IN2.

In one embodiment, the number threshold value is set as 10 times. If the transceiver 213 determines that the determination number of the current channel is greater than 10, the transceiver 213 accumulates the energy intensity of the current channel (e.g., accumulating the energy intensity in a specific period) and detects the energy feature.

In operation 440, the transceiver 213 determines a spectrum range occupied by a user of the unlicensed channel according to an accumulated result of the energy intensity and the energy feature. For example, the transceiver 213 accumulates the energy intensities detected in the frequency periods IN1, GP and INP2 to obtain the accumulated result.

In one embodiment, it is known that different users are corresponding to different energy features in the present communication system. For example, the energy feature illustrated in FIG. 5 is that higher energy occurs in two frequency periods IN1 and IN2 and lower energy occurs in the frequency period GP which is between these two frequency periods IN1 and IN2. Accordingly, the transceiver 213 is able to determine that the user corresponding to this energy feature is the Wi-Fi system.

In one embodiment, it is known that the frequency band range of the Wi-Fi system is normally greater than the frequency band range of the Bluetooth system, the frequency band range of the Bluetooth system is normally greater than the frequency band range of the wireless microphone, and the frequency band range of the wireless microphone is normally greater than the frequency band range of the wireless television. Moreover, the energy intensity of the transmission signal of various communication systems may be different, too.

Therefore, the transceiver 213 is able to determine a user signal occupying the unlicensed channel according to the frequency band range, the accumulated result, and/or the distribution of the energy feature, wherein the user signal means the type of the signal which occupies the unlicensed channel at present, for example, a Wi-Fi signal, a Bluetooth signal, a wireless microphone signal, or a wireless television signal.

Accordingly, the transceiver 213 is able to determine the possible user who occupies the unlicensed channel, estimate the possible channel range occupied by the user of the unlicensed channel, and predict the occupied condition of the user of the unlicensed channel.

In operation 450, the transceiver 213 avoids using the spectrum range, and measures another unlicensed channel. For example, the transmission device 210 with the LTE system determines that the unlicensed channel is occupied by another device with the Wi-Fi system, the transceiver 213 of the transmission device 210 avoids using the spectrum range of this unlicensed channel, i.e., it does not transmit the to-be transmitted data through this spectrum range.

In one embodiment, the transceiver 213 selects another unlicensed channel, and transmits the to-be transmitted data to the base station eNB3 or downloads the to-be transmitted data from the base station eNB3 through the another unlicensed channel. In one embodiment, the transceiver 213 is able to detect another unlicensed channel by the aforementioned operations. If the another unlicensed channel is not occupied by other transmission devices yet, the transceiver 213 measures the another unlicensed channel.

In operation 460, when the transceiver 213 passes the determination of the energy detection for the current channel, it transmits the upstream data and the measured data to the base station eNB3 through the current channel. Since the transmission device 210 fails to have the authority and the ability to change the transmission channel, it is only able to measure the target channel and report the measured information to the base station eNB3. The base station eNB3 still has the final discretion for switching channel. Therefore, in the present embodiment, the transmission device 210 still completes data transmission through the current channel, and uploads the measured information simultaneously.

In one embodiment, the transceiver 213 transmits a measured result (e.g., the accumulated result of the energy intensity, the energy feature and/or the spectrum range) to the base station eNB3, and the measured result is able to provide the base station eNB3 for communication and modulation. In one embodiment, plural of transmission devices are able to perform the transmission method 400, respectively, to provide the respective measured results to the base station eNB3 for application.

By the aforementioned transmission method, transmission device and transmission system, plural of devices are able to avoid interfering or competing with each other for accessing the same unlicensed channel when they share the unlicensed spectrum.

As mentioned above, by measuring the energy information of the current channel and estimating the users who occupy the unlicensed channel, the present disclosure is able to avoid selecting the unlicensed channel occupied by the users and select another unlicensed channel which is unoccupied. Accordingly, the present disclosure provides a transmission method, a transmission device and a transmission system which are able to effectively and precisely share the wireless communication resource through the unlicensed spectrum.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A transmission device for sharing an unlicensed channel in a wireless communications system, comprising:
    an antenna configured for receiving a current channel information, the current channel information comprising an unlicensed channel information of the unlicensed channel; and
    a first transceiver configured for measuring an energy information of a current channel according to the unlicensed channel information;
    wherein when the first transceiver determines that the energy information is greater than a trigger threshold value, the first transceiver accumulates an energy intensity of the current channel and detects an energy feature,
    wherein the first transceiver determines a spectrum range occupied by a user of the unlicensed channel according to an accumulated result of the energy intensity and the energy feature, avoids using the spectrum range, and measures an another unlicensed channel.

2. The transmission device of claim 1, wherein the current channel information further comprises an internal channel information, and the transmission device further comprises:
    a second transceiver configured for measuring an internal channel corresponding to the internal channel information and transmitting a to-be transmitted data through the internal channel.

3. The transmission device of claim 2, further comprising:
    a database; and
    a processor configured for storing the internal channel information and an external channel information in the database.

4. The transmission device of claim 1, wherein the energy information is determined as a waiting time or a determination number in which the first transceiver determines the current channel.

5. The transmission device of claim 4, wherein when the energy information is the waiting time, the trigger threshold value is a time threshold value.

6. The transmission device of claim 4, wherein when the energy information is the determination number, the trigger threshold value is a number threshold value.

7. The transmission device of claim 1, wherein when the first transceiver determines that the energy information is greater than the trigger threshold value, the first transceiver determines a user signal occupying the unlicensed channel by measuring the energy feature;
    wherein the energy feature comprises a bandwidth information or a signal distribution feature.

8. A transmission method for sharing an unlicensed channel in a wireless communications system, comprising:
    receiving a current channel information by an antenna, wherein the current channel information comprises an unlicensed channel information of the unlicensed channel;

measuring an energy information of a current channel by a first transceiver according to the unlicensed channel information;

accumulating an energy intensity of the current channel and detecting an energy feature by the first transceiver when the energy information is greater than a trigger threshold value;

determining a spectrum range occupied by a user of the unlicensed channel by the first transceiver according to an accumulated result of the energy intensity and the energy feature; and avoiding using the spectrum range and measuring an another unlicensed channel by the first transceiver.

9. The transmission method of claim 8, wherein the current channel information further comprises an internal channel information, and the transmission method further comprises:

transmitting a to-be transmitted data through an internal channel corresponding to the internal channel information by a second transceiver.

10. The transmission method of claim 9, further comprising:

storing the internal channel information and an external channel information in a database by a processor.

11. The transmission method of claim 8, wherein the energy information is determined as a waiting time or a determination number in which the first transceiver determines the current channel.

12. The transmission method of claim 11, wherein when the energy information is the waiting time, the trigger threshold value is a time threshold value.

13. The transmission method of claim 11, wherein when the energy information is the determination number, the trigger threshold value is a number threshold value.

14. The transmission method of claim 8, further comprising:

determining a user signal occupying the unlicensed channel by measuring the energy feature by the first transceiver when the energy information is greater than the trigger threshold value;

wherein the energy feature comprises a bandwidth information or a signal distribution feature.

15. A transmission system for sharing an unlicensed channel in a wireless communications system, comprising:

a base station configured for transmitting a current channel information, the current channel information comprising an unlicensed channel information of the unlicensed channel;

an antenna configured for receiving the current channel information; and a transceiver configured for measuring an energy information of a current channel according to the unlicensed channel information;

wherein when the transceiver determines that the energy information is greater than a trigger threshold value, the transceiver accumulates an energy intensity of the current channel and detects an energy feature, wherein the transceiver determines a spectrum range occupied by a user of the unlicensed channel according to an accumulated result of the energy intensity and the energy feature, avoids using the spectrum range, and measures an another unlicensed channel.

* * * * *